Sept. 2, 1969   E. R. BOLLES   3,464,470
STALK SEGMENTING APPARATUS
Filed Feb. 17, 1967   3 Sheets-Sheet 1

INVENTOR
ELMER RICHARD BOLLES

BY
Burns, Doane, Benedict, Swecker & Mathis
ATTORNEYS

Sept. 2, 1969  E. R. BOLLES  3,464,470
STALK SEGMENTING APPARATUS
Filed Feb. 17, 1967  3 Sheets-Sheet 2

INVENTOR
ELMER RICHARD BOLLES
BY
Burns, Doane, Benedict, Swecker & Mathis
ATTORNEYS.

United States Patent Office 3,464,470
Patented Sept. 2, 1969

3,464,470
STALK SEGMENTING APPARATUS
Elmer Richard Bolles, Honolulu, Hawaii, assignor to Hawaiian Sugar Planters Association, Honolulu, Hawaii, a voluntary nonprofit agricultural organization
Filed Feb. 17, 1967, Ser. No. 616,863
Int. Cl. A01d 55/18, 57/20
U.S. Cl. 146—98                                                11 Claims

ABSTRACT OF THE DISCLOSURE

Cane stalks positioned transversely of a conveyor are fed towards a plurality of rotating knives spaced transversely of the conveyor. A plurality of rollers, transversely aligned with the knives, are provided with transversely extending channels for segregating canes and feeding them radially against the knives. Each roller includes a circumferential groove within which an edge portion of the adjacent knife extends to a greater radial depth than the channels so that canes are completely severed. The knives are positively rotated at the same peripheral speed as the rollers. The knives are yieldingly biased to their operating position and may be pushed outwardly by stones or the like traveling with the cane to reduce knife damage.

Background of invention

In preparing harvested cane stalks for subsequent processing, such as for example sugar extraction, it is frequently advantageous to cut the cane stalks, which are relatively long as harvested, into shorter segments. For this purpose, various stalk segmenting machines are frequently utilized.

One common form of stalk segmenting apparatus includes a plurality of transversely spaced, endless belt conveyors which feed the transversely positioned canes toward a plurality of rapidly rotating knives. The knives are spaced transversely intermediate the conveyors and driven by a rotating shaft fixed in its relation to the conveyors. Such a construction, though often used, may sometimes prove unsatisfactory for a number of reasons.

For example, each cane at its point of contact with the cutting knives may be held thereagainst only by the pressure of the advancing canes immediately behind it. In this event, radial pressure exerted by any particular knife on the stalk may be sufficient to bow the stalk away from the knife at that point, thus permitting the stalk to pass through with only partial severance. This possibility that canes will be only partially severed increases as the cutting discs become blunted in use.

Another severance problem of a different nature may arise if there is a tangential speed differential between the knife periphery and the speed of travel of the cane past the knife. Such difference may cause marked ripping and tearing of the cane in the area of the cut, with unwanted loss of juice and production of clogging plup. A further problem occurring in a situation where knife speed is not positively related to cane feed speed may be caused by occasional impact of the knives against foreign objects amongst the canes which leads to sudden deceleration of the knives.

Another disadvantage if the cane stalks are mixed with foreign objects such as rocks, stones and other detritus from the harvesting field, is that a rigidly supported knife encountering a stone may frequently be seriously damaged thereby.

In addition, after such an incident, uninterrupted feeding of the conveyor taking away the severed segments of cane may permit the stone or fragments of it to pass on to subsequent stages of processing with possible harmful effects.

Summary of invention

It is therefore a particular object of the invention to provide a stalk segmenting apparatus so constructed as to minimize the possibility that individual cane stalks may be only partially severed during the segmenting process.

It is another main object to provide a stalk segmenting apparatus in which the peripheral cutting speed of the cutting knives is maintained at approximately the same speed as that of the stalks past the knives to provide a particularly clean and uniform cut.

It is another object of the invention to provide a stalk segmenting apparatus in which potential damage to the cutting knives caused by the presence of stones and the like amongst the cane, is effectively reduced.

The drawings

In accordance with these objects, an apparatus forming one preferred embodiment of the present invention is illustrated in the accompanying drawings in which.

Description of the preferred embodiment

Figure 1:
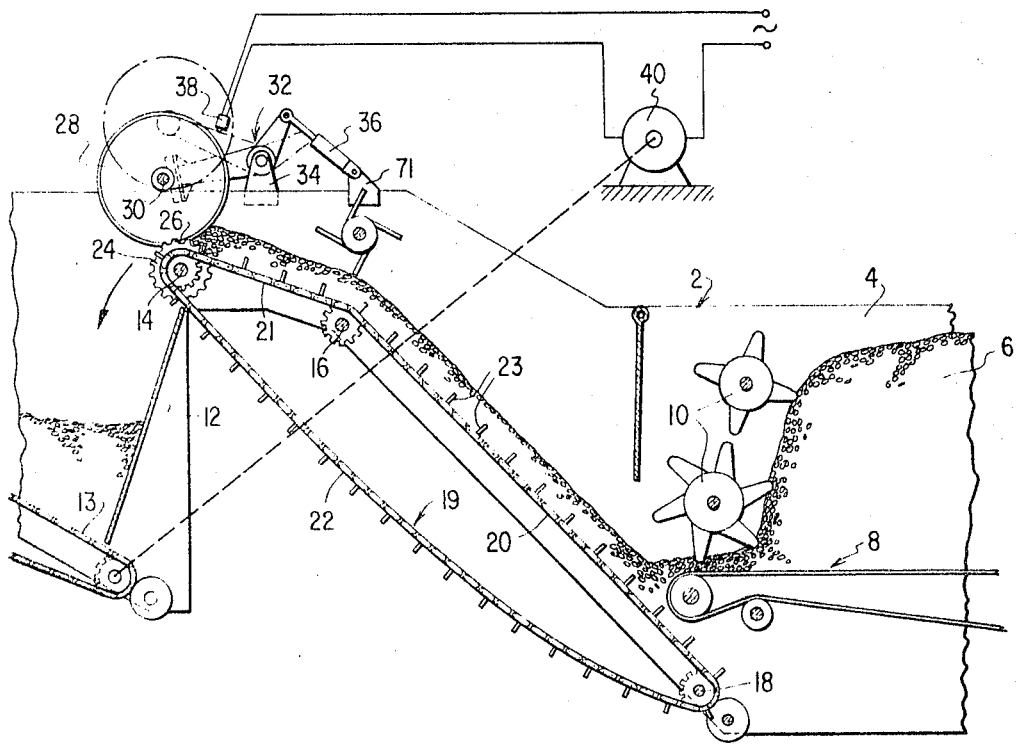
FIGURE 1 is a side view, partially in cross section, of a representative cane stalk processing system including a stalk segmenting apparatus forming the preferred embodiment of the present invention.

Referring to FIGURE 1 of the drawings, the preferred embodiment of the invention is there shown installed in fixed surrounding structure generally designated as 2. The particular structure 2 shown includes a rearwardly positioned feed hopper 4 from which piled cane stalks 6 are fed by a conveyor 8 to a pair of star wheels 10 which distribute the cane uniformly from the feed hopper. The surrounding structure 2 also includes a forwardly positioned receiving hopper 12 provided with a takeaway conveyor 13. It will be appreciated that the particular surrounding structure 2 does not constitute an essential part of the invention and may be varied if the invention is to be utilized in cane stalk segmenting processes of a different kind.

The apparatus of the present invention includes vertically spaced upper, intermediate and lower transversely extending sprocket shafts 14, 16 and 18, respectively, drivingly supporting a plurality of vertically extending, transversely spaced, endless conveyors 19. Each conveyor includes a forwardly and steeply, upwardly inclined lower portion 20 extending from the lower sprocket shaft 18 to the intermediate shaft 16, a relatively shallowly inclined upper portion 21 extending from the shaft 16 to the shaft 14 and a return loop 22. Each conveyor is provided with a plurality of spaced, upstanding supports 23 for retaining the cane stalks on and transversely of the conveyors during passage of the stalk from the lower to the upper end of the conveyors. Concentric with and drivingly mounted upon the upper sprocket shaft 14 are a plurality of circumferentially grooved rollers 24 spaced transversely intermediate the conveyors 19. The rollers 24 are provided about the peripheries with transversely aligned, radially spaced, scalloped channels 26 adapted to segregate individual canes from the mass of stalks supported transversely upon the conveyors 19 and feed them into contact with a plurality of cutting knives 28 aligned with the rollers 24. The cutting knives 28 are drivingly mounted on a knife shaft 30 supported at each of its transverse extremities by two bell cranks 32. Each bell crank 32 is pivotally mounted at its apex to a fixed support 34. An upper free extremity of each bell crank 32 is connected to one of two transversely spaced hydraulic rams 36 which exert a biasing force holding the knives in an operative position. In this position, a portion of each disc knife 28 is partially embraced by the circumferential groove in its associated roller 24 and extends radially inward thereof to a greater depth than the transversely extending, stalk supporting channels 26, thus ensuring that each cane is fully severed. The rams 36 permit the knives to move away from the rollers if a stone should come between any knife disc and its associated roller 24. At the same time, such displacement moves the knife shaft 30 upwardly causing a portion of one of the bell cranks 32 to contact a microswitch 38 which breaks an electrical circuit to a motor 40 driving the takeaway conveyor 13. Any stone fragments and the like may then be manually removed.

Figure 2:
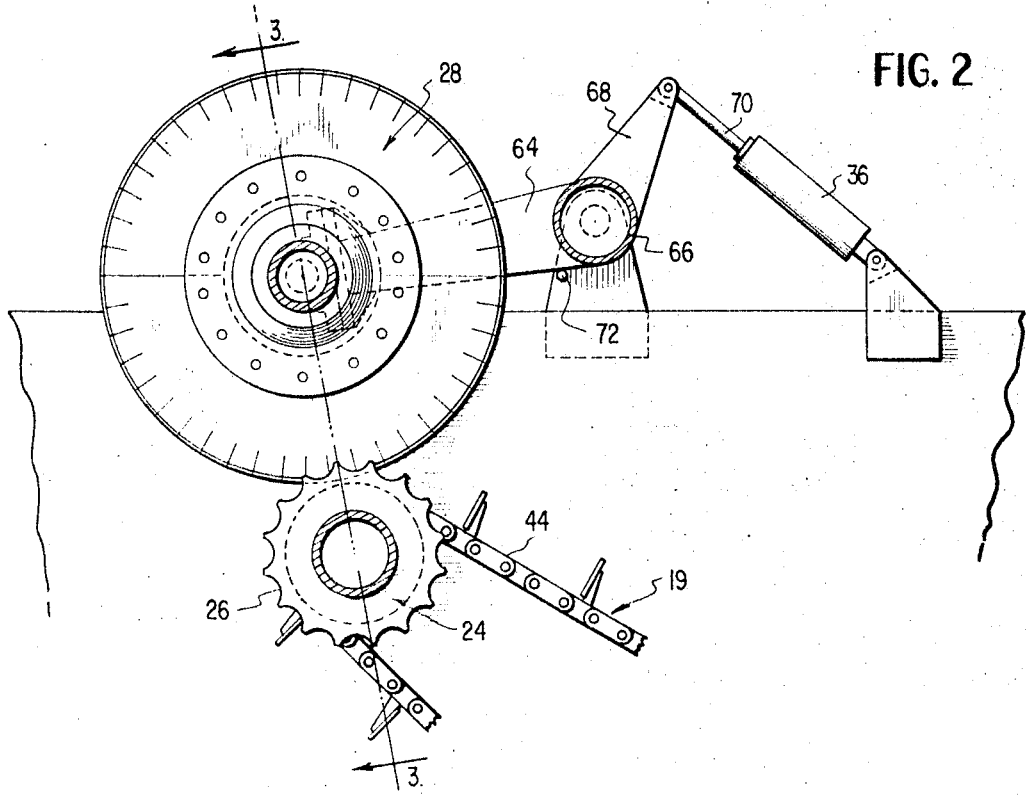
FIGURE 2 is a cross-sectional side view of a knife and roller pair forming a portion of the apparatus shown in FIGURE 1.
Figure 3:
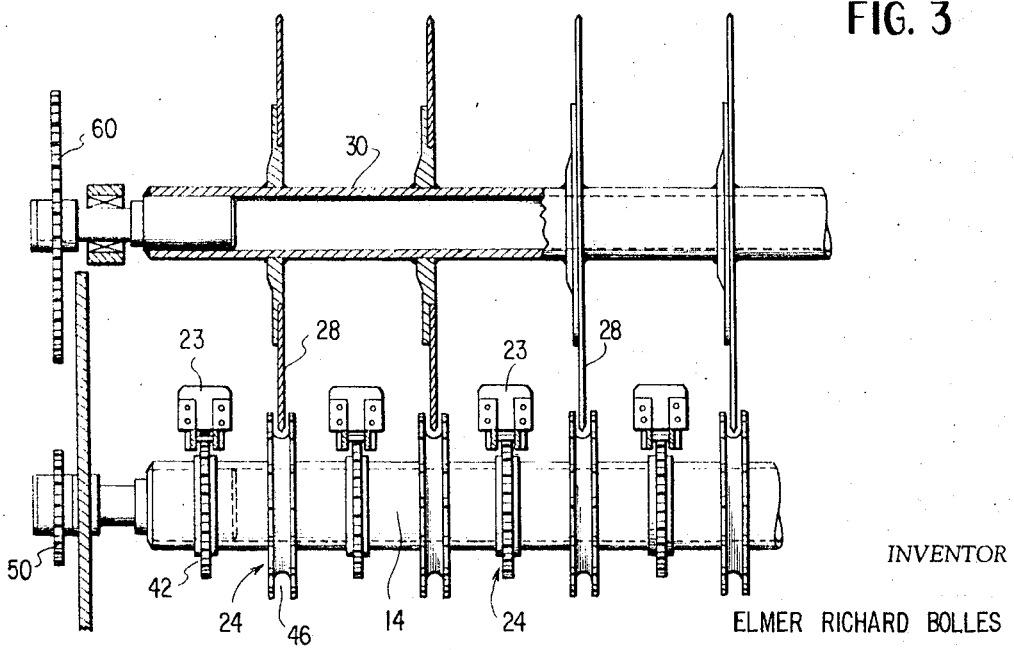
FIGURE 3 is an end view, partially in cross section, of a portion of the apparatus shown in FIGURE 2 taken along the lines 3—3 therein.

Referring in more detail to FIGURES 2 and 3, the previously mentioned upper sprocket shaft 14 which is rotatably mounted at its transverse extremities in adjacent fixed portions of the general surrounding structure 2, has fixedly mounted to it a plurality of transversely spaced upper sprocket wheels 42 drivingly engaging chain links 44 of the conveyor belts 19. Spaced symmetrically intermediate the upper sprocket wheels 42 are the previously mentioned rollers 24 of relatively greater diameter than the sprocket wheels 42. Each roller 24 is provided with a relatively deep circumferential groove 46. In addition, the circumference of each roller 24 is scalloped to provide the previously mentioned transversely extending channels 26. The channels 26 in each roller 24 are arranged in transverse alignment with the channels 26 in each of the other rollers 24.

Each channel is generally arcuate and is shaped to receive at least one stalk. The greatest radial depth of each channel 26 is less than the radial depth of the groove 46 and, in addition, does not extend below the maximum radius of the sprocket wheels 42. In an operative position the knife shaft 30 supports each knife disc 28 with the portion of its peripheral cutting edge most close to its associated roller 24, lying within the groove 46 and extending radially inwardly thereof to a point below the deepest radial extent of the adjacent transversely extending channel 26.

In operation, as the general mat of stalks supported on the conveyor belts 19 is fed into contact with the rollers 24, individual stalks are partially received with certain of the channels 26 on one or more of the various rollers 24. As the rollers 24 continue to rotate in a direction from the upper surface of the conveyors 19 towards the knives 28, the particular cane stalks engaged by the channels 26 are separated from the mat and fed positively against the disc knives 28. It will be appreciated that the rollers 24 exert a positive radial force urging the stalks within the grooves 26 against the disc knives 28 to increase cutting efficiency. Furthermore, as the operative cutting portion of each knife 28 embraced within the groove 46 in each associated roller 24 extends below the deepest radial extent of the adjacent channel 26, complete severance of the stalks is assured.

It will additionally be appreciated that transverse alignment of the channels 26 on the various rollers 24 ensures that the stalks fed toward the cutting discs will be severed at a plurality of points at the same time, thereby preventing inequality in the length of the various cut segments due to a diagonal bowing away of the cane stalk as a whole along its length, at the time it reaches the disc knives 28.

The previously mentioned upper sprocket shaft 14 is provided at one of its extremities with a toothed sprocket wheel 50 drivingly connected via a conventional chain tensioning system (not shown) to an intermediate drive sprocket 52 (FIGURE 4) fixedly secured to a shaft 56. The shaft 56 is mounted on fixed portions of the general surrounding structure 2 for rotation about an axis concentric with the pivotal axis of the previously mentioned bell cranks 32. Also fixedly mounted on the shaft 56 and transversely spaced from the intermediate drive sprocket 52 is a second intermediate drive sprocket 58 drivingly chain connected to a knife drive sprocket 60 fixedly secured to an adjacent end of the knife shaft 30.

A particular feature of the invention resides in the gear ratio of the various sprockets 50, 52, 58 and 60 which is so related to the differing radii of the knife discs 28 and the associated rollers 24 as to provide the cutting knives 28 and the rollers 24 with generally the same peripheral speed. In general the combined gear ratio of these sprockets is such as to provide the shafts 14 and 30 with a value of relative angular rotation in inverse ratio to the value of the relative magnitudes of the radii of the rollers 24 and knives 28 respectively, supported on the shafts 14 and 30. This ensures that the cutting force directed by the knives 28 on the stalks is essentially radial in its nature without any substantial tangential component as might be caused by differential rotation speeds, thus avoiding any unnecessary tangential ripping and tearing of portions of the cane adjacent the cut with consequent loss of juice, generation of unwanted pulp and other undesirable features. Additionally and importantly, the positive driving connection thus afforded between the conveyor and the knives ensures that the latter are not decelerated by occasional contact with foreign bodies traveling with the stalks.

It will be appreciated that the chain drive described, from the upper sprocket shaft 14 to the axis of pivoting of the bell cranks 32 and from there to the knife shaft, obviates any chain extension problems that might otherwise be caused by change in the relative separation of the knife shaft 30 from the upper sprocket shaft 14, when this arises, as previously described, due to the presence of stones or the like.

Figure 4:
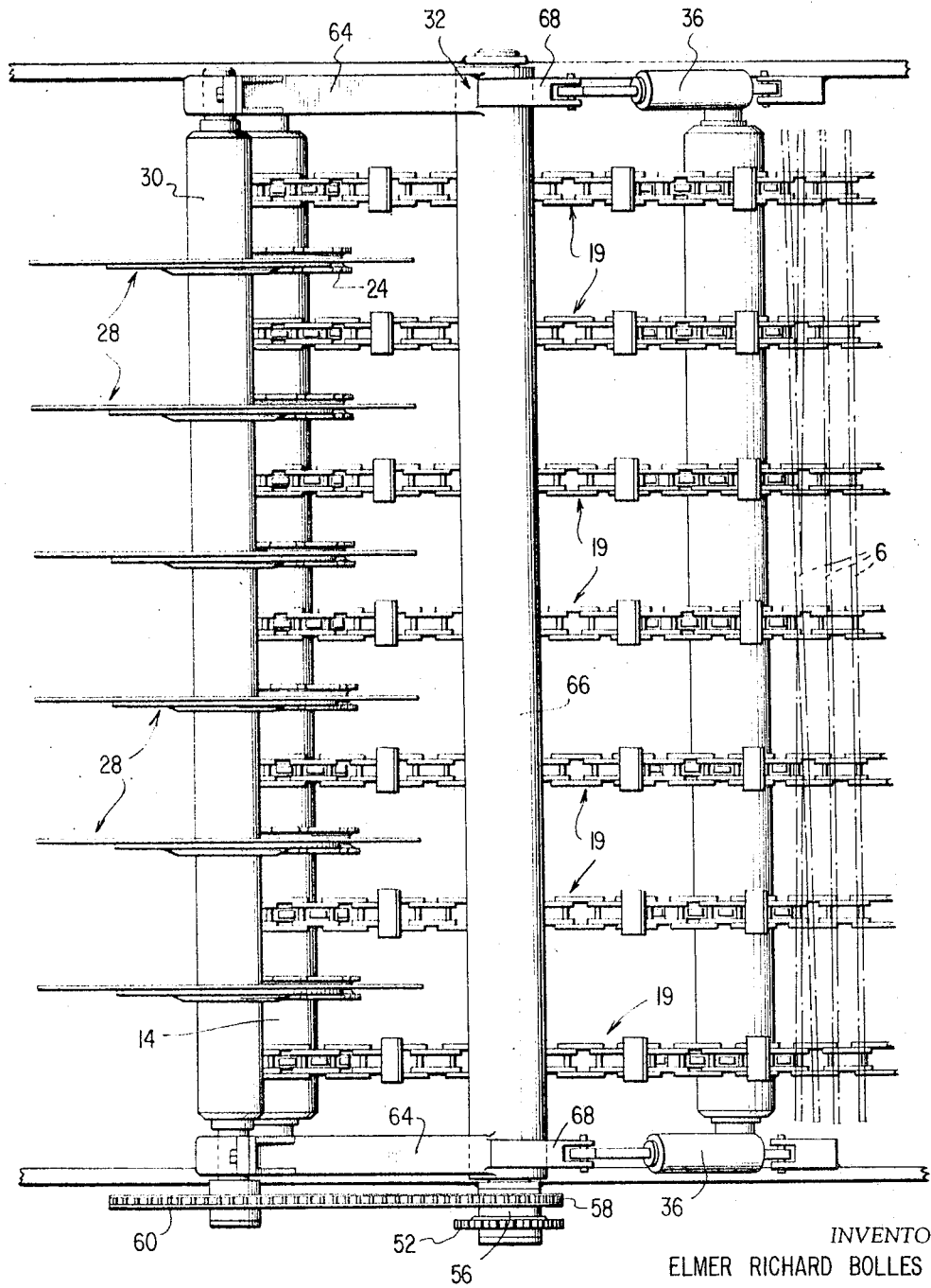
FIGURE 4 is a plan view of a portion of the apparatus shown in FIGURE 1 looking downwardly upon the transversely spaced knives.

Referring to FIGURE 4, the knife shaft 30, in an operating position positioned above, parallel to, coextensive with and generally slightly forward of the upper sprocket shaft 14, is rotatably supported at its transverse extremities by the rear extremities of two transversely spaced, opopsed, forwardly extending lower arms 64 forming portions of the previously mentioned bell cranks 32. The lower arms 64 at their rear extremities are fixedly secured to a shaft 66 extending transversely above and beyond the conveyors 19 and supported at its extremities by the previously mentioned fixed portions 34 (FIGURE 1) of the general surrounding structure 2 for rotation about an axis concentric with that of the previously mentioned shaft 56 but independently thereof. An upper arm 68 of each bell crank 32 is fixedly secured to the transverse shaft 66 in longitudinal alignment with the lower arm 64 and extends generally perpendicularly therefrom in an upward and rearward direction.

The free upper extremity of each upper arm 68 is attached to a piston rod 70 of one of each of the two previously mentioned hydraulic cylinders 36, the cylinder 36 being pivotally mounted at their rearward extremities to fixed portions 71 (FIGURE 1) of the surrounding general structure 2.

The positioning of the fixed supports 34 and 71 on the surrounding general structure 2 in relation to the upper sprocket shaft 14 is such that, with the knives 28 in the previously described operative position in relation to the rollers 24 the upper arms 68 of the bell cranks 45 are inclined upwardly and rearwardly at approximately 45°, with the piston rods 70 extending rearwardly and in a direction generally perpendicular to the arms 68.

Hydraulic pressure applied to each of the cylinders 36 tending to force the piston rod 70 outwardly thereof causes the disc knives 28 to be biased radially downwardly toward the rollers 24. Motion of the cutters 28 downwardly is limited by abutting contact between the lower surfaces of the lower arms 64 of the bell cranks 32 and suitably positioned abutment stops 72 (FIGURE 2) provided on the surrounding structure. At the time such abutting contact occurs, the perpipheral portions of the cutter knives are in the operating position previously described relative to the rollers 24.

Figure 5:
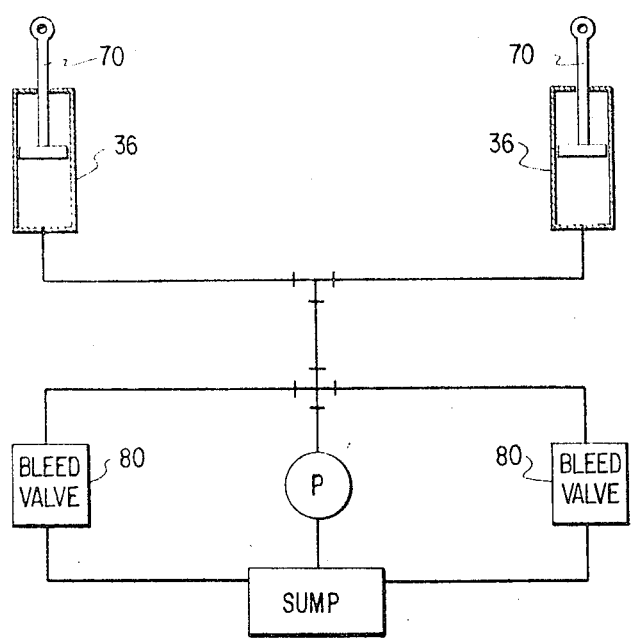
FIGURE 5 is a simplified schematic view of an hydraulic biasing system forming a part of the present invention.

A schematic representation of one hydraulic circuit used to provide the required biasing force is shown in FIGURE 5. A pump P constantly delivers fluid under pressure from a sump to the piston side of the two hydraulic cylinders 36. A first bleed-off valve 80 operable at a predetermined first pressure permits fluid to cycle from the pump to the sump so that pressure in the cylinder 36 is maintained at the predetermined first pressure. If a stone or the like should come between one or more of the disc knives 28 and its associated roller 24, this force the knife 28 and hence the knife shaft 30 upwardly. The upward motion of the knife shaft 30 is transmitted through the bell crank 32 to the piston rod 70, with the result that the pressure in the system is increased. The excess pressure is relieved through a second bleed valve 82 set to operate at a higher predetermined pressure than the first bleed-out valve 80, permitting fluid from the cylinders 36 to return to the sump, so that the piston rods 70 move inwardly of the cylinders 36, permitting the knives 28 to move away from the rollers 24.

It will be appreciated that in this manner the knives 28 may be moved rapidly out of contact with the obstruction so that damage to the knives is minimized.

Referring to FIGURE 1, it will be seen that after the knife shaft 30 has moved a predetermined distance, the upper surface of one of the lower arms 64 of the bell crank 32 will contact the previously mentioned microswitch 38, thereby opening its contacts and cutting off the electrical power connection to the previously mentioned electric motor 40 driving the takeoff conveyor 13 so that the stone may be manually removed from the receiving hopper.

In constructing a stalk segmenting apparatus according to the present invention it will be seen that particular advantages of efficiency and safety are provided. In particular, the drive connection between the knives and the rollers to provide them with a generally equal peripheral speed ensures that the knives are not substantially decelerated by occasional contact with a foreign object and additionally provides a clean, efficient cut.

Another considerable advantage arises from the manner in which the portions of the knife edges adjacent to their associated rollers extend radially inwardly within the roller grooves to a deeper position than the transverse scalloped channels, ensuring that each cane stalk is completely severed at the point of cut, with no possibility of partial severance due to bowing of the stalk from the cutter.

Another significant advantage is afforded by the manner in which the blades are yieldingly biased towards the stalks so that on occasional impact with hard matter such as stones traveling with the stalks, the knives are permitted to move away before substantial damage arises.

Although the invention is described with reference to one preferred embodiment, it will be apparent to those skilled in the art that additions, deletions and modifications, substitutions and other changes not specifically described and illustrated in this embodiment may be made which will fall within the purview of the appended claims.

I claim:

1. Apparatus for cutting long stalks such as sugarcane into short segments comprising:
   a set of tranversely spaced rotating cutting knives,
   a plurality of transversely spaced rotating rollers, each said roller including,
      a circumferential groove,
      stalk engaging elements disposed about the periphery of said roller,
   the peripheries of said knives extending into the circumferential grooves of said rollers,
   the relative positioning of said rotating cutting knives and said rotating rollers being such that the rollers impart a thrust on the stalks in a direction generally radially of said rotating knives, and
   means for driving said rotating knives at a peripheral speed approximately equal to the peripheral speed of said rollers.

2. An apparatus as defined in claim 1 wherein;
   said rollers are fixedly mounted on a rotatable first common shaft,
   said knives are fixedly mounted on a rotatable second common shaft, and
   means connecting said first and second shafts for concurrent rotation, said means substantially relating the relative angular rates of rotation of said first shaft to said second shaft in inverse ratio to the relative magnitudes of the radii of said rollers to said knives.

3. An apparatus as defined in claim 2 wherein said connecting means comprises a chain and sprocket drive.

4. Stalk segmenting apparatus comprising;
   spaced-apart parallel rotary shafts,
   one of said shafts carrying transversely spaced cutting knives and
   a plurality of transversely spaced rollers fixedly mounted on the other of said shafts,
   each of said rollers having a circumferential groove positioned in mating relation with a corresponding cutting knife,
   transversely extending channels disposed around the periphery of each of said rollers with the corresponding transverse channels of spaced rollers in transverse alignment,
   said circumferential grooves being deeper than said transverse channels whereby the peripheral edges of said cutting knives penetrate into said circumferential grooves of said rollers to a point beyond the depth of said transverse channels.

5. A sugarcane segmenting apparatus comprising:
   conveyor means for advancing a mat of generally parallel sugarcane stalks extending substantially transversely of said conveyor means,
   a set of positively driven transversely spaced rotating cutter knives adjacent the delivery end of said conveyor means,
   stalk feeding means associated with said conveyor means and driven at substantially the same peripheral speed as said knives for feeding sugarcane stalks from said conveyor means adjacent the delivery end thereof and effective to impart a thrust thereon in a direction substantially radially inwardly of said rotating cutter knives.

6. A sugarcane segmenting apparatus as defined in claim 5 wherein said feeding means comprises;
   rollers each provided around its periphery with transversely extending channels.

7. Apparatus for segmenting sugarcane stalks to facilitate cleaning thereof comprising:
   a conveyor for advancing long sugarcane stalks in substantial parallel relation and in a direction transverse to their length,
   segmenting means associated with said conveyor,
   said segmenting means including,
      transversely spaced rotating cutting knives, and
      corresponding transversely spaced rotating circumferentially grooved rollers mating with said knives,
      each of said grooved rollers having transverse cane-engaging elements disposed about the periphery thereof, said rollers arranged to move cane from the plane of said conveyor and impart a thrust thereon in a direction generally radially of said cutting knives, and means for driving said cutting knives at a peripheral speed aproximately equal to the peripheral speed of said rollers.

8. In a sugarcane segmenting apparatus embracing a set of transversely spaced rotary knives and a set of correspondingly transversely spaced circumferentially grooved rollers mating with said knives;

means for imposing a predetermined cane cutting pressure on said knives in a direction toward said rollers, means permitting said knives to move in a direction away from said rollers to permit passage of foreign objects between said knives and rollers, and automatic means for reestablishing said predetermined cane cutting pressure on said knives and returning them to cane cutting relationship with said rollers.

9. A stalk segmenting apparatus comprising:

longitudinally extending conveyor means for conveying stalks in a direction substantially perpendicular to their length.

a plurality of rotating knives spaced transversely of said conveyor means adjacent one longitudinal extremity thereof for cutting each of the stalks into segments, backup means adjacent said one longitudinal extremity of said conveyor means cooperating with said conveyor means to feed stalks positively against said knives, movable means for movably supporting said knives in predetermined operating position in relation to said backup means, and biasing means contacting said movable means for exerting a predetermined biasing force upon said knives for urging said knives to said predetermined operative position.

10. A stalk segmenting apparatus as defined in claim 9 wherein said biasing means comprises;

hydraulic rams operatively connected with said knives and said backup means for urging said knives toward said backup means upon application of hydraulic pressure to said rams, pump means for supplying hydraulic fluid under pressure to said hydraulic rams, and first bleed means operative at a first determined pressure interposed between said pump means and said hydraulic rams for permtiting hydraulic fluid to bypass said rams.

11. A stalk segmenting apparatus as defined in claim 10 further including;

second bleed means connected with the said rams responsive to a predetermined hydraulic pressure in said rams higher than said first predetermined pressure for relieving pressure fluid from said hydraulic rams in response to over pressure therein to permit said knives to move away from said backup means.

References Cited
UNITED STATES PATENTS

| | | |
|---|---|---|
| 2,544,275 | 3/1951 | Moragne. |
| 2,506,985 | 5/1950 | Arnt _____ 146—98 |
| 2,823,717 | 2/1958 | Amori _____ 146—73 |
| 3,353,576 | 11/1967 | Cooper _____ 146—98 X |

W. GRAYDON ABERCROMBIE, Primary Examiner